(12) United States Patent
Zeretzke

(10) Patent No.: US 6,301,890 B1
(45) Date of Patent: Oct. 16, 2001

(54) GAS MIXTURE PREPARATION SYSTEM AND METHOD

(75) Inventor: Herbert Zeretzke, Ruhwinkel (DE)

(73) Assignee: MaK Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 09/628,781

(22) Filed: Jul. 31, 2000

(30) Foreign Application Priority Data

Aug. 17, 1999 (DE) .............................................. 199 39 289

(51) Int. Cl.[7] .................................................... F02G 3/00
(52) U.S. Cl. ................................. 60/616; 60/614; 60/597
(58) Field of Search ............................. 60/597, 614, 616, 60/618

(56) References Cited

U.S. PATENT DOCUMENTS 4,214,450 * 7/1980 Nagashima et al. ................. 60/648
4,545,208 * 10/1985 Kuhn ...................................... 60/648
4,733,536 * 3/1988 DiBella et al. ........................ 60/618

FOREIGN PATENT DOCUMENTS 38 36 463    9/1998 (DE).

* cited by examiner

*Primary Examiner*—Hoang Nguyen
(74) *Attorney, Agent, or Firm*—Alan J. Hickman (57) ABSTRACT

A system for preparing gas mixtures for combustion, reducing emissions during combustion and treating and purifying resultant exhaust gas mixtures includes an exhaust gas scrubbing and condensing heat exchanger which cleans, cools and dries an exhaust gas mixture, a source of clean water which supplies clean water for heating and humidifying, a steam producer for converting clean water to steam, a steam boiler for increasing the energy of the steam and the energy of a fluid compound gas. An exhaust gas turbine, a steam turbine, and a fluid compound gas turbine all mounted on a common shaft are operative to convert energy in the exhaust gas mixture, the steam, and the fluid compound gas to mechanical energy on the common shaft. The system is particularly suited for use with an internal combustion engine.

48 Claims, 2 Drawing Sheets

GAS MIXTURE PREPARATION SYSTEM AND METHOD

TECHNICAL FIELD

This invention relates to a gas mixture system of an internal combustion engine and more particularly to a system and method for preparing gas mixtures for combustion, reducing undesirable emissions during combustion, and treating and purifying resulting exhaust gas mixtures.

BACKGROUND ART

It has been known in the art to provide an internal combustion engine with a turbocharger to boost air pressure and engine power. Such engines typically have a fuel system which injects or otherwise provides fuel to mix with the boosted air and provide a gas mixture to a combustion chamber(s) of the internal combustion engine. Combustion of the gas mixture in the combustion chamber(s), under pressure ignition, generally provides good combustion and a relatively clean exhaust gas mixture. However, with more stringent government regulations, additional measures are required to obtain even cleaner exhaust gas mixtures with reduced emissions of carbon dioxide, nitrous oxides, sulfur dioxide, particle and soot emissions are needed.

Attempts have been made to reduce the amount of undesirable compounds in the exhaust emissions of an internal combustion engine. One system commonly used returns a portion of the exhaust gas mixture emitted from the combustion chamber after combustion back to the combustion chamber to be mixed with the gas mixture to be combusted. Such a system is successful in reducing somewhat some oxides of nitrogen in the exhaust gas mixture. However, additional treatment of the exhaust gas under more stringent regulations may be required.

Exhaust gas catalytic converters have been used in the exhaust system for many years. Such converters have been satisfactory in removing a greater amount of oxides of nitrogen. However, catalytic converters do not satisfactorily remove sulfur dioxide when fuel having a high sulfur content is used. As a result, the cost of operation of the internal combustion engine increases when low sulfur fuels are required. Finally, the exhaust gas catalytic converter consumes energy and reaction substances, for example, urea resulting in high operational costs.

In ship applications, strict restrictions apply in most regions of the world with respect to soot and particle emissions of the internal combustion engine. Steps in reducing emissions of nitrous oxides can lead to an increase in soot emissions of the internal combustion engine. Also, certain ship maneuvering operations can lead to a deterioration in combustion conditions in the combustion chamber of the internal combustion engine (a too rich air/fuel ratio). No satisfactory solution to this problem has been made.

Exhaust gas turbine driven electrical generators are occasionally used to exploit mechanical residual working capacity of the exhaust gas mixture. The exhaust gas turbine driven generator is separate from and in addition to the exhaust gas turbine of the turbocharger and receives the exhaust gas mixture after the exhaust gas turbine the turbocharger. A separate exhaust gas turbine driven electrical generator, such as this, has a low efficiency because of the low useable pressure drop of the exhaust gas mixture and adds additional cost and complexity.

Separate steam turbine electrical generator assemblies are commonly used in combination with diesel engines to produce electrical energy. In such arrangements a condenser is required to dissipate heat, unused, into seawater or a cooling tower. The effectiveness of this combination is low however because of a high cost and an undesirable loss of condensation.

State of the art internal combustion engines have a high rate of turbocharging resulting in a reduced transient response capability. As a result, the turbocharger is not able to deliver sufficient energy in a relatively short period of time.

The present invention is directed at overcoming one or more of the problems set forth above.

DISCLOSURE OF THE INVENTION

In one aspect of the present invention a method of preparing gas mixtures of an internal combustion engine is provided. The method includes delivering an exhaust gas mixture of combustion gases, air and moisture from a combustion chamber of the internal combustion engine to an exhaust gas turbine, from the exhaust gas turbine to an exhaust gas boiler, and from the exhaust gas boiler to an exhaust gas scrubbing and condensing heat exchanger. Delivering steam from a steam producer to the exhaust gas boiler and increasing the energy level of the steam in the exhaust gas boiler by increasing the temperature and pressure of the steam. Delivering the steam at the increased energy level from the exhaust gas boiler to a steam turbine and expanding the steam. Delivering the expanded steam to an exhaust gas scrubbing and condensing heat exchanger containing water, combining the expanded steam with the exhaust gas mixture, condensing the expanded steam to water, and aerating the water. Cleaning the exhaust gas mixture by transferring undesirable substances in the exhaust gas mixture to the aerated water.

In another aspect of the present invention, a gas mixture preparation system for an internal combustion engine, is provided. The gas mixture preparation system includes an exhaust conduit connected in fluid communication with a combustion chamber of the internal combustion engine. The exhaust conduit passes an exhaust gas mixture from the combustion chamber to an exhaust gas turbine connected in fluid communication with the exhaust conduit and the exhaust turbine rotates in response to receiving the exhaust gas mixture. The exhaust conduit further passes the exhaust gas mixture to an exhaust gas boiler connected in fluid communication with the exhaust gas turbine. The exhaust gas boiler receives the exhaust gas mixture passed from the exhaust gas turbine. A steam producer connected in fluid communication with said exhaust gas boiler and delivers a steam to the exhaust gas boiler. The exhaust gas boiler receives the steam and increases the energy level of the steam by increasing the temperature and pressure of the steam. The exhaust gas boiler is connected in fluid communication with an exhaust gas scrubbing and condensing heat exchanger having a water aerator and a containing water therein. The exhaust gas scrubbing and condensing heat exchanger is adapted to receive the exhaust gas mixture being passed from the exhaust gas boiler. A steam turbine is connected in fluid communication with the exhaust gas boiler and the exhaust gas scrubbing and condensing heat exchanger. The steam turbine is connected by a common shaft to the exhaust gas turbine. The steam turbine and exhaust gas turbine are rotatable together. The steam turbine receives the steam at the increased energy level and rotates in response thereto. The steam turbine expands the steam and delivers the expanded steam to the exhaust gas scrubbing and condensing heat exchanger. The exhaust gas scrubbing and condensing heat exchanger combines the expanded steam with the exhaust gas mixture, condenses the expanded steam to water, aerates the water to produce aerated water, cleans the exhaust gas mixture by transferring undesirable substances in the exhaust gas mixture to the aerated water and dries the cleaned exhaust gas mixture.

BEST MODE FOR CARRYING OUT THE INVENTION

Figure 1:
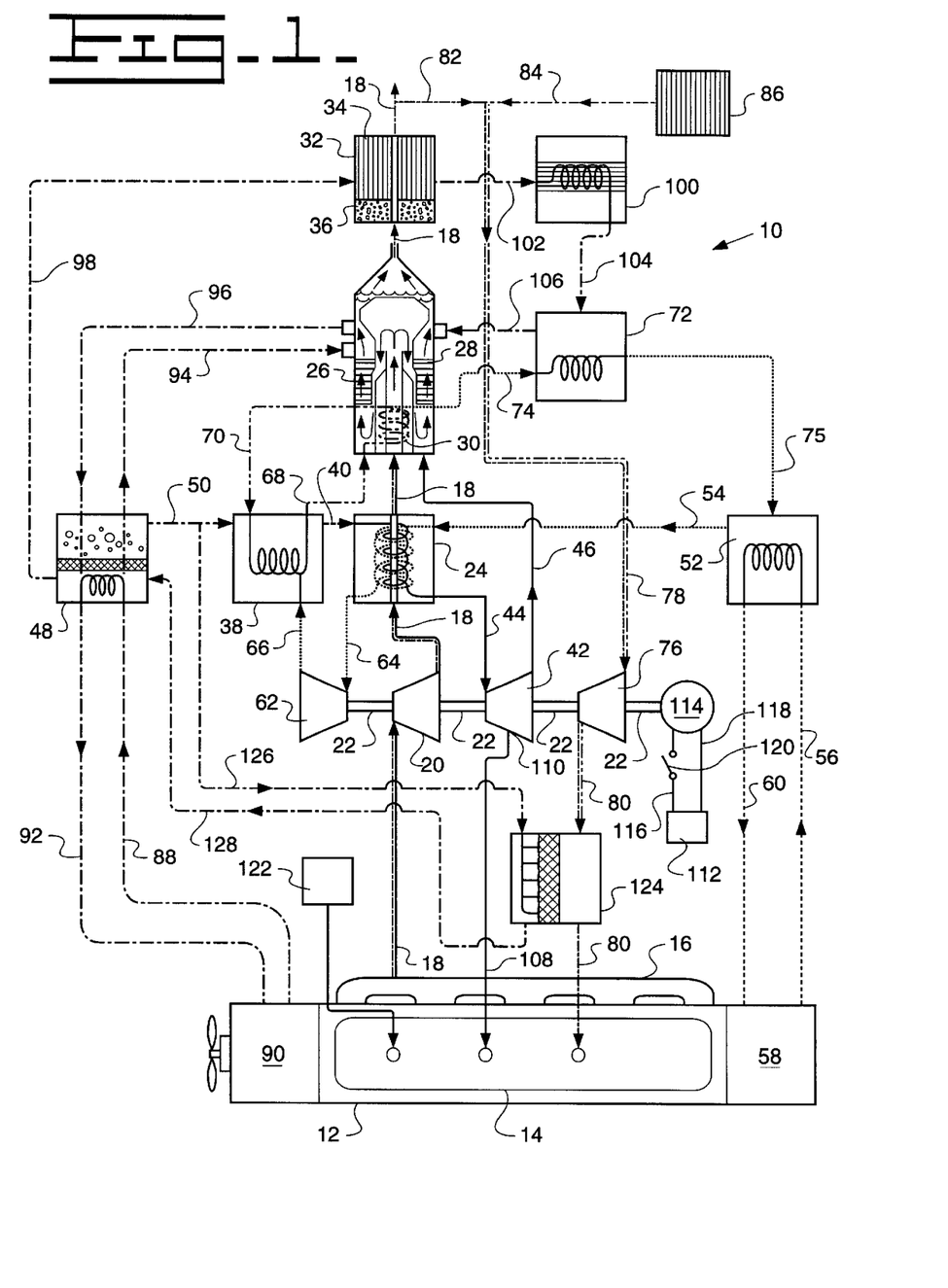
FIG. 1 is a diagrammatic schematic showing an embodiment of a gas mixture preparation system for an internal combustion engine of the present invention.
Figure 2:
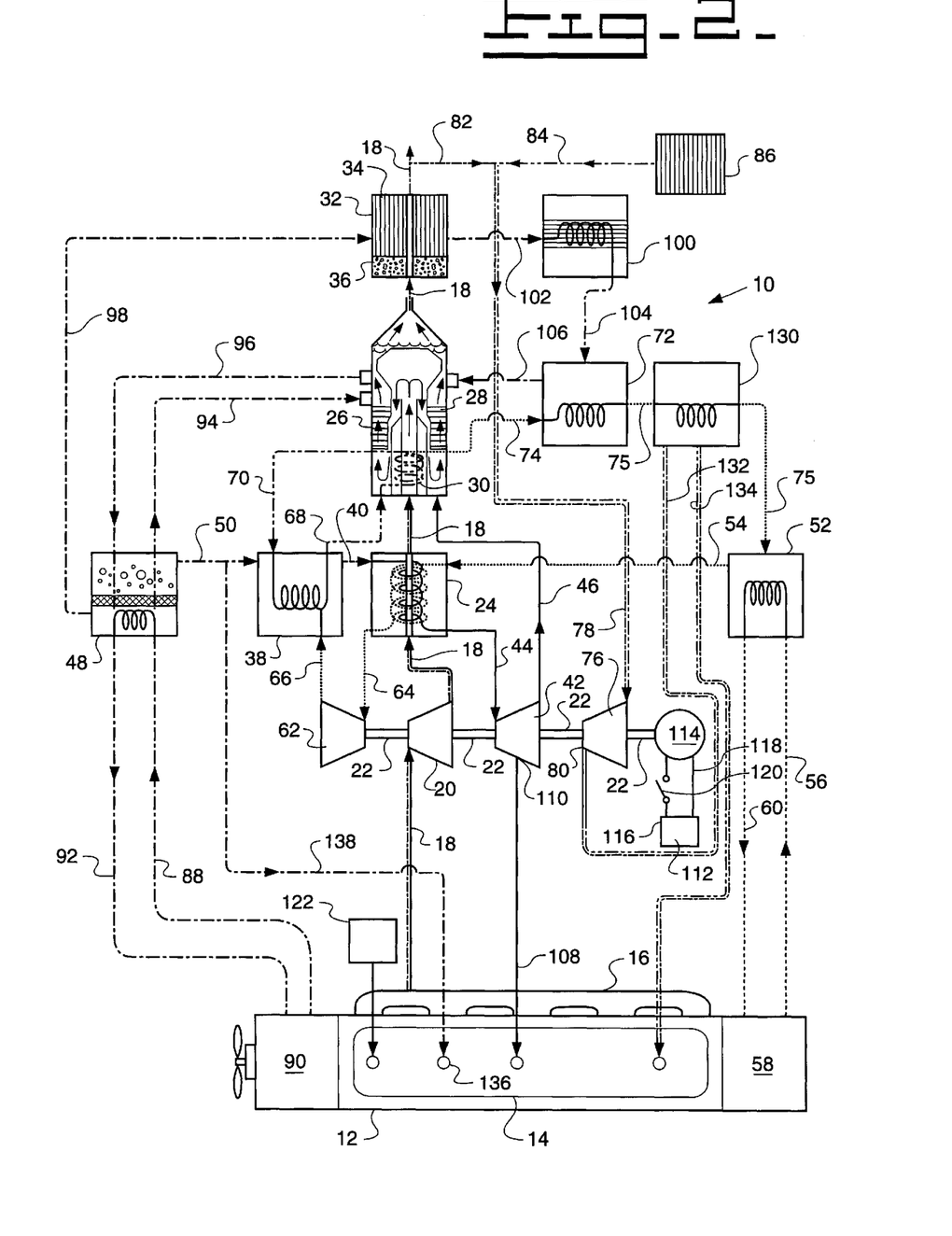
FIG. 2 is a diagrammatic schematic showing another embodiment of a gas mixture preparation system for an internal combustion engine of the present invention.

With reference to the drawings, FIGS. 1 and 2, a gas mixture preparation system 10 is shown connected to an internal combustion engine 12, and in particular a diesel engine. The internal combustion engine has a combustion chamber inlet 14, for example, an inlet manifold, connected to at least one combustion chamber (not shown) and a combustion chamber outlet 16, for example, an exhaust manifold connected to the at least one combustion chamber, all in a conventional manner. The combustion chamber inlet 14 receives various fluids in the liquid and gas states to support combustion in the combustion chamber and the combustion chamber outlet 16 delivers an exhaust gag mixture of combustion gases, air and moisture from the combustion chamber.

An exhaust conduit 18 is connected to and between the combustion chamber outlet 16 and an exhaust gas turbine 20 and passes the exhaust gas mixture from the combustion chamber outlet 16 to the exhaust gas turbine 20. The exhaust gag turbine is mounted on a common shaft 22 and rotates the common shaft 22 in response to receiving the exhaust gas mixture.

An exhaust gas boiler 24 is connected by the exhaust conduit 18 to the exhaust gas turbine 20 and receives exhaust gas mixture passed from the exhaust gas turbine 20 by the exhaust conduit 18. Energy from the heated exhaust gas mixture is used in the exhaust gas boiler 24 for heating purposes. This will be subsequently discussed in greater detail.

An exhaust gas scrubbing and condensing heat exchanger 26 is connected in the exhaust conduit 18 and receives exhaust gas mixture passed from the exhaust gas boiler 24 by the exhaust conduit 18. The exhaust gas scrubbing and condensing heat exchanger 26 has a water aerator 28. The exhaust gas mixture passing through the water aerator 28 causes bubbles to form in water contained in the exhaust gas scrubbing and condensing heat exchanger 26. The bubbles collect undesirable substances from the exhaust gas mixture, transfers them to the water, and also dries and cools the cleaned exhaust gas mixture. The exhaust gas scrubbing and condensing heat exchanger 26 also has a condenser 30.

A filter 32 is connected in the exhaust conduit 18 and receives the heat of the cleaned exhaust gas mixture from the exhaust gas scrubbing and condensing heat exchanger 26 that is cooled and dried. The filter 32 has a filtering element 34 which filters the extremely tainted water generated in the gas mixture preparation system 10, removes undesirable substances from the extremely tainted water separated at the source, and passes filtered water therefrom. The filter 32 may include a dryer which utilizes heat energy in the exhaust gas to dry the filtering element 34 and cause the undesirable filtered out substances to separate from the filtering element.

A steam producer 38 is connected in fluid communication with the exhaust gas boiler 24 and delivers steam to the exhaust gas boiler by a steam carrying conduit 40. The exhaust gas boiler 24 receives the steam from the steam carrying conduit 40 and increases the energy level of the steam by increasing the temperature and pressure of the steam.

A steam turbine 42 is connected by the common shaft 22 to the exhaust gas turbine 20 and rotates together with the exhaust gas turbine 20. The steam turbine 42 is connected in fluid communication with the exhaust gas boiler 24 by conduit 44 and is connected in fluid communication with the exhaust gas scrubbing and condensing heat exchanger 26 by conduit 46. The steam turbine 42 receives the steam at the increased energy level from the exhaust gas boiler 24 and rotates in response thereto. The steam turbine 42 expands the steam and delivers the expanded steam to the exhaust gas scrubbing and condensing heat exchanger 26 by way of the conduit 46. The expanded steam is mixed in the exhaust gas scrubbing and condensing heat exchanger 26 with the exhaust gas mixture and the steam condensed into water.

A source of clean water 48 is connected by a clean water conduit 50 to the steam producer 38. The clean water conduit delivers clean water from the source of clean water 48 to the steam producer 38. The steam producer 38 produces steam from the clean water which is supplied by steam carrying conduit 40.

An evaporator 52 of conventional design is connected in fluid communication with the exhaust gas boiler 24 by conduit 54. Conduit 54 delivers a second fluid compound, having a lower boiling point than water, in a gaseous state to the exhaust gas boiler 24.

A first fluid passing transfer conduit 56 is connected to a supply of internal combustion engine fluid 58, for example, an engine lubrication system, and to the evaporator 52. The first fluid passing transfer conduit 56 delivers an internal combustion engine fluid in a heated state to the evaporator 52 and provides an amount of heat energy sufficient to heat the second fluid compound above the boiling point and convert the second fluid compound from a liquid to a gas. A second fluid passing transfer conduit 60 is connected to the evaporator 52 and to the supply of internal combustion engine fluid 58. The second fluid passing transfer conduit 60 returns the internal combustion engine fluid in a cooled state to the supply of internal combustion fluid.

A fluid compound gas turbine 62 is connected to the common shaft 22 and rotatable with the exhaust gas turbine 20 and the steam turbine 42. The fluid compound gas turbine 62 is connected in fluid communication with the gas boiler 24 by a conduit 64 and with the steam producer 38 by a conduit 66. The gas boiler 24 heats the second fluid compound in the gaseous state to an elevated energy level and delivers the second fluid compound to the fluid compound gas turbine 62. The fluid compound gas turbine 62 transfers a portion of the elevated energy level of the second fluid compound at the gaseous state into additional mechanical energy on the common shaft 22 and delivers the second fluid compound at a reduced energy level in the gaseous state to the steam producer 38.

A first fluid mixture passing conduit 68 is connected between the steam producer 38 and the exhaust gas scrubbing and condensing heat exchanger 26. The first fluid mixture passing conduit 68 passes a first fluid mixture having a predetermined concentration of water and a fluid compound having a lower boiling point than water to the exhaust gas scrubbing and condensing heat exchanger 26. The first fluid mixture is heated by the exhaust gas mixture and the expanded steam and condensed in the exhaust gas scrubbing and condensing heat exchanger 26. This heating and condensing produces a second fluid mixture having a lower concentration of the fluid compound by driving out the second fluid compound in the gaseous state. The fluid compound and the second fluid compound is preferably ammonia however, other suitable fluid compounds having a lower boiling point than water could be utilized.

A second fluid mixture passing conduit 70 is connected between the steam producer and the exhaust gas scrubbing and condensing heat exchanger 26. The second fluid mixture passing conduit 70 delivers the second fluid mixture having a lower concentration of the second fluid compound to the steam producer 38. The steam producer 38 combines the second fluid mixture with the second fluid compound delivered by conduit 66 in the gaseous state, absorbs the second fluid compound in the gaseous state by the second fluid mixture, generates a resulting heat and changes the state of the clean heated water into the steam being delivered to the exhaust gas boiler 24 by steam carrying conduit 40.

A condenser 72 is connected in fluid communication with the exhaust gas scrubbing and condensing heat exchanger 26 by conduit 74. The condenser 72 receives the second fluid compound driven out by the exhaust gas scrubbing and condensing heat exchanger 26 in the gaseous state passed by conduit 74 and converts the second compound from the gaseous state to the liquid state and passes the second fluid compound in the liquid state to the evaporator 52 by conduit 75.

A compressor 76 is connected to the common shaft 22 and rotatable with the common shaft 22. A compressor inlet conduit 78 is connected in fluid communication with the compressor 76 and a compressor outlet 80 is in fluid communication with the combustion chamber inlet 14. An exhaust gas recirculation conduit 82 is connected to the exhaust conduit 18 and the compressor inlet conduit 78. An ambient air conduit 84 connected to the compressor inlet conduit 78 and is open to ambient air. The compressor 76 receives from the compressor inlet conduit 78 a charge gas mixture of at a least a portion of the cooled, dried and clean exhaust gas mixture from the exhaust gas recirculation conduit 82 and the ambient air from the ambient air conduit 84. The compressor 76 boosts the pressure of the charge gas mixture and delivers the charged gag Mixture through the compressor outlet 80 to a combustion chamber inlet 14 of the internal combustion engine. An air filter assembly 86 of any suitable design is provided to filter the ambient air entering the ambient air conduit 84.

A first water jacket fluid passing conduit 88 is connected between a water jacket 90 of the internal combustion engine 12 and the source of clean water 48. The first water jacket fluid passing conduit 88 passes a heated water jacket fluid to the source of clean water 48. The source of clean water 48 transfers the heat energy from the water jacket fluid and heats, condenses, and separates undesirable impurities from water contained in the source of clean water 48. The source of clean water 48 delivers the cleaned heated water via the clean water conduit 50 to the steam producer 38.

A second water jacket fluid passing conduit 92 is connected between the cooling system 90 of the internal combustion engine 12 and the source of clean water 48. The second water jacket fluid passing conduit passes the water jacket fluid having been cooled in the source of clean water 48 to the cooling system of the internal combustion engine 12.

First and second tainted water conduits 94,96 are each connected to and between the source of clean water 48 and the exhaust gas scrubbing and condensing heat exchanger 26. The first and second tainted water conduits 94,96 circulate tainted water, containing emission particles, water from the exhaust gas mixture which has been dried and cleaned, and a filtered water supplied to the exhaust gas scrubbing and condensing heat exchanger 26, between the source of clean water 48 and the exhaust gas scrubbing and condensing heat exchanger 26. The source of clean water 48 condenses and separates the clean water from the tainted water.

An extremely tainted water passing conduit 98 connected to the source of clean water 48 and to the filter 32 delivers the extremely tainted water from the source of clean water to the filter. A water cooler 100 is connected to the filter 32 by a filtered water passing conduit 102. The filtered water passing conduit 102 passes the filtered water to the water cooler 100. The water cooler 100 is of conventional design and may utilize the cooling properties of either air or liquid, for example, seawater. The water cooler cools the filtered water and passes the cooled filter water to the condenser 72 by conduit 104. The condenser 72 changes the state of the second fluid compound from the gaseous state to the liquid state by heating the cooled filtered water and passing a resulting heated filtered water through a heated filter water conduit 106 to the exhaust gas scrubbing and condensing heat exchanger 26.

A steam conduit 108 connects an outlet 110 of the steam turbine 42 to a combustion chamber inlet 14 of the internal combustion engine 12. The steam conduit 108 delivers the steam from the steam turbine 42 at a predetermined pressure to a combustion chamber inlet of the internal combustion engine 12, moisturizes the combustion gasses to be combusted, and thereby reduces nitrous oxides produced during a combustion process of the internal combustion engine 12.

An electrical energy source 112, for example, a battery or an electrical power grid, is connected to an electric motor/generator 114 by first and second conductors 116,118. A switch 120 is connected in the first conductor 116 and selectively actuatable between a closed position at which electrical energy flows between the electrical energy source 112 and said electric motor/generator 114 an open position at which electrical energy is blocked from flowing between said electrical energy source 112 and said electric motor/generator 114. Although the switch 120 has been described as a mechanical switch it is to be recognized that solid state and other devices may be substituted. The electric motor/generator 114 is connected to the common shaft 22 and delivers mechanical energy to the common shaft 22 or receives mechanical energy from the common shaft 22. It is to be noted that the electric motor/generator 114 can either generate electrical power for supplying the electrical energy source with additional electrical energy or be driven as a motor by the electrical energy source 112 to supply power to the common shaft 22 to increase the output of the compressor 42 under certain engine operating conditions. When the switch 120 is open the electrical motor/generator 114 is disabled.

Thus it can be seen that the exhaust gas turbine 20, the compressor 76, and at least one of said steam turbine 42 and compound gas turbine 62 deliver mechanical energy to the common shaft.

A source of fuel 122, such as, a fuel injector or homogenizer, is connected to the combustion chamber inlet 14 and delivers a fuel mixture to the combustion chamber inlet 14. A homogenizer emulsifies clean water delivered from the source of clean water 48 and a supplied fuel and provides an emulsion as the fuel mixture. Such devices are well known in the art.

Referring exclusively to FIG. 1, in addition to the above described, the gas mixture preparation system 10, includes a humidifier 124 connected to and between the compressor outlet 80 and the combustion chamber inlet 14. A first clean water passing conduit 126 is connected between the source of clean water 48 and the humidifier 124. The first clean water passing conduit 126 delivers the clean water to the humidifier 124 which humidifies and cools the charge gas mixture being delivered to the combustion chamber inlet 14. A second clean water passing conduit 128 passes an unused portion of the clean water to the source of clean water 48.

The embodiment of FIG. 2, is identical to that of FIG. 1, as heretofore described with the exception of the humidifier 124 and associated connecting first and second clean water connecting conduits 126,128 and the structure to be subsequently discussed herein. All identical structural components in FIGS. 1 and 2 have been numbered the same.

Referring to FIG. 2, a heat exchanger 130 having an inlet conduit 132 and an outlet conduit 134 is connected at the heat exchanger inlet conduit 132 to the compressor outlet 80 and at the outlet conduit 134 to the combustion chamber inlet 14. The heat exchanger 130 removes heat from the charge air mixture and adds heat to the second fluid compound. The heat exchanger 130 is connected in fluid communication with the condenser 72. The heat exchanger 130 receives the second fluid compound flow in the liquid state, heats the second fluid compound by transferring heat from the charge air mixture and delivers the second fluid compound flow in said liquid state to said evaporator 52.

A water intake nozzle 136 is connected to the combustion chamber intake 14 and is adapted to inject clean water into the combustion chamber intake 14. A water injector conduit 138 is connected between the source of clean water 48 and the water intake nozzle 136 and is adapted to deliver clean water to the water intake nozzle 136.

Industrial Applicability

With reference to the drawings, and in operation, the preparation of the gas mixture for combustion, the reduction of emissions during combustion as well as the treatment and purification of the resultant exhaust gas mixtures are achieved by the gas mixture preparation system 10 of the internal combustion engine 12 in an energy efficient manner.

The exhaust gas mixture of combustion gases, air and moisture from a combustion chamber outlet 16 of the internal combustion engine 12 is directed to the exhaust gas turbine 20, from the exhaust gas turbine 20 to an exhaust gas boiler 24, and from the exhaust gas boiler 24 to an exhaust gas scrubbing and condensing heat exchanger 26. The energy level of the steam delivered from the a steam producer 38 to the exhaust gas boiler 24 is increased in the exhaust gas boiler 24 by increasing the temperature and pressure of the steam. The steam is delivered at said increased energy level from the exhaust gas boiler 24 to a steam turbine 42 and the steam is expanded. The expanded steam is delivered to the exhaust gas scrubbing and condensing heat exchanger 26 containing water therein. The expanded steam is combined with the exhaust gas mixture, the expanded steam is condensed to water, and the water in the exhaust gas scrubbing and condensing heat exchanger 26 is aerated. The exhaust gas mixture is cleaned by transferring the undesirable substances in the exhaust gas mixture to the aerated water.

The clean heated water from the source of clean water 48 is delivered to the steam producer 38 wherein steam from the clean heated water is produced. Mechanical energy from the steam turbine 42 is delivered to a common shaft 22 connecting the exhaust gas turbine 20 to the steam turbine 42.

The first fluid mixture having a predetermined concentration of water and fluid compound is delivered to the exhaust gas scrubbing and condensing heat exchanger 26. The first fluid mixture is heated in the exhaust gas scrubbing and condensing heat exchanger 26 by the exhaust gas mixture and the condensing heat of the expanded steam. A resulting second fluid mixture is produced from the first fluid with a lower concentration of the fluid compound than the first fluid mixture. A second fluid compound in a gaseous state is produced from the first fluid mixture. The resulting second fluid mixture is delivered from the exhaust gas scrubbing and condensing heat exchanger 26 to the steam producer 38 and the second fluid compound in the gaseous state is delivered to a condenser 72.

The second fluid compound is converted from the gaseous state to a liquid state in the condenser 72. The second fluid compound in the liquid state is delivered from the condenser 72 to the evaporator 52. The second fluid compound in the liquid state is heated in the evaporator 52 by the heated engine lubrication oil which converts the second fluid compound from the liquid state to a gaseous state. The second fluid compound in the gaseous state is passed from the evaporator 52 to the exhaust gas boiler 24 which subsequently heats the second fluid compound in the gaseous state to an elevated energy level. The second fluid compound at the elevated energy level gaseous state is delivered to a fluid compound gas turbine 62 which transfers a portion of the elevated energy level of the second fluid compound in the gaseous state into mechanical energy at the fluid compound gas turbine 62 and delivers the mechanical energy to the common shaft 22. The second fluid compound in the gaseous state is delivered from the fluid compound gas turbine 62 to the steam producer 38 wherein the second fluid compound is combined with the second fluid mixture. The second fluid mixture absorbs the second fluid compound in the gaseous state, generates a resultant heat by increasing the concentration of the second fluid compound in the second fluid mixture, and changes the state of the clean heated water to steam by way of the resulting heat.

The exhaust gas mixture is also cooled and dried in the exhaust gas scrubbing and condensing heat exchanger 26. A portion of the exhaust gas mixture which has been cleaned, dried and cooled is combined with ambient air to form a combustion intake gas mixture. This combustion intake gas mixture is delivered to a compressor 76. The pressure of the combustion intake gas mixture is boosted by the compressor 76. A resulting boosted combustion intake gas mixture is delivered from the compressor 76 to the combustion chamber inlet.

As shown in the embodiment of FIG. 1, the humidifier 124, which also performs a cooling function, cools and humidifies the boosted combustion intake gas mixture. A predetermined amount of clean water from the source of clean water 48 is delivered the humidifier 48 to provide a source of moisture for the humidifying and cooling process. The cooled and humidified boosted combustion intake gas mixture is delivered to a combustion chamber inlet 14 of the internal combustion engine 12 thereby reducing nitrous oxides during a combustion process of the internal combustion engine 12 through the use of both humidified air and the cooled, clean, and dry exhaust gas mixture.

As shown in FIG. 2, the second fluid compound is converted from the gaseous state to a liquid state in the condenser 72 and delivered in said liquid state to the heat exchanger 130. The heat exchanger 130 receives from the compressor 76 a pressure boosted and heated combustion intake gas mixture. The temperature of the second fluid compound is increased by the pressure boosted and heated combustion intake gas mixture in the heat exchanger 130. The second fluid compound in the liquid state is delivered from the heat exchanger 130 to the evaporator 52. In the embodiment of FIG. 1, the heat exchanger is not required because of the provision of the humidifier 124 which cools and humidifies, and the second fluid compound in the liquid stated is delivered from the condenser 72 to the evaporator 52

Referring to FIGS. 1 and 2, the heated jacket water from the cooling system 90 of the internal combustion engine 12 is delivered to the source of clean water 48. Water, in a vacuum, is heated in the source of clean water 48 by the heated jacket water and converted to steam and condensation. The steam is further condensed to clean water and the clean water is delivered to the steam producer 38.

Extremely tainted water having undesirable impurities is delivered from the source of clean water to a filter 32. The extremely tainted water passes through the filter element 34 which removes impurities from the extremely tainted water. The exhaust gas mixture passed from the exhaust gas scrubbing and condensing heat exchanger 26 is passed to a dryer 36. The heat from the exhaust gas mixture dries the filter 34 and aspirates out the dried filtered impurities.

Filtered water from the filter is passed to a water cooler 100 which cools the filtered water. The filtered water which has been cooled is delivered from the water cooler 100 to the condenser 72 to cool the second fluid compound passed from the exhaust gas scrubbing and condensing heat exchanger in the gaseous state. This cooling converts the second fluid compound from the gaseous state to a liquid state.

The filtered water from the condenser 72 is delivered to the exhaust gas scrubbing and condensing heat exchanger 26 for cooling the exhaust gas mixture. The filtered water is combined with the water being aerated in the exhaust gas scrubbing and condensing heat exchanger 26 and supplies make up water to be combined with water at the source of clean water 48. Clean heated water is produced in the source of clean water 48 from a combination of the make up water and the water at the source of clean water 48. It is to be noted that this gas mixture preparation system 10 operates without requiring an external water supply by recovering water from the exhaust gas mixture, condensed steam, and burned off hydrogen in a combusted fuel mixture.

Steam from said steam turbine 42 is optionally delivered at a predetermined pressure to a combustion chamber inlet 14 of the internal combustion engine 12. The steam supports a reduction in nitrous oxides produced during a combustion process of the internal combustion engine 12.

In the embodiment of FIG. 2, clean water from the source of clean water 48 is optionally delivered to a water intake nozzle connected to a combustion chamber inlet 14 of the internal combustion engine 12 to provide additional moisture to reduce nitrous oxides produced during the combustion process of the internal combustion engine 12.

A Fuel mixture is delivered from the source of fuel 122 to the combustion chamber inlet 14 to support energy requirements of combustion of the internal combustion engine 12. The source of fuel 122 may include a fuel injector of any well known type capable of delivering a petroleum fuel mixture or a homogenizer of a well known type capable of delivering a water/fuel emulsion fuel mixture.

The common shaft 22 which is rotatable receives mechanical energy from the exhaust gas turbine 20, the steam turbine 42 and the fluid compound gas turbine 62 all connected to the common shaft 22 and transfers mechanical energy between the exhaust gas turbine 42, the compressor 76, the steam turbine 42 and the compound gas turbine 62 connected to common shaft 22. Mechanical energy present at the common shaft 22 is transferable to the electric motor/generator 114 connected thereto. The electric motor/generator 114 is driven by the common shaft 22 to generate electricity for a large assortment of uses. Conversely, electrical energy delivered to the electric motor/generator 114 will cause the electric motor/generator 114 to drive the common shaft 22 and increase the boost pressure of the compressor when required under certain internal combustion engine 12 operating conditions.

The switch 120 permits a disabling of the electrical motor/generator from delivering and receiving electrical energy as may be necessary under certain operating conditions.

It can thus be seen that, through the use of the gas mixture preparation system 10 of the instant invention, the operational costs of the internal combustion engine 12 is reduced and internal combustion efficiency is maximized. This is achieved through a significant increase in the utilization of fuel energy and in a reduction in carbon dioxide emissions. Further, the reduction of oxides of nitrogen achieved through the moist combustion air and cooled exhaust gasses is significant. Since catalytic converters are not required urea is not produced and any costs associated therewith is eliminated. Also, since expensive catalysts are not used, high sulfur fuel mixtures may be utilized which further reduces the cost of operation. The treatment of the exhaust gasses by the exhaust gas scrubbing and condensing heat exchanger 26 also reduces the potential for soot and particle emissions.

Other as aspects and advantages of the present invention may be ascertained by a reading of the drawings, the specification and the appended claims.

What is claimed is:

1. A method of preparing gas mixtures of an internal combustion engine, comprising the steps of:

delivering an exhaust gas mixture of combustion gases, air and moisture from a combustion chamber outlet of the internal combustion engine to an exhaust gas turbine, from the exhaust gas turbine to an exhaust gas boiler, and from the exhaust gas boiler to an exhaust gas scrubbing and condensing heat exchanger;

delivering a steam from a steam producer to the exhaust gas boiler and increasing the energy level of the steam in the exhaust gas boiler by increasing the temperature and pressure of the steam;

delivering said steam at said increased energy level from the exhaust gas boiler to a steam turbine and expanding the steam;

delivering the expanded steam to the exhaust gas scrubbing and condensing heat exchanger containing water therein;

combining the expanded steam with the exhaust gas mixture, condensing the expanded steam to water, aerating the water in the exhaust gas scrubbing and condensing heat exchanger, and cleaning the exhaust gas mixture by transferring the undesirable substances in the exhaust gas mixture to the aerated water.

2. The method, as set forth in claim 1, including the steps of:

delivering a clean heated water from a source of clean water to the steam producer; and producing said steam from the clean heated water in the steam producer.

3. The method, as set forth in claim 2, including the step of delivering a mechanical energy from the steam turbine to a common shaft connecting the exhaust gas turbine to the steam turbine.

4. The method, as set forth in claim 2, including the steps of:

supplying a first fluid mixture having a predetermined concentration of a water and a fluid compound to the exhaust gas scrubbing and condensing heat exchanger, said fluid compound having a lower boiling point than water;

heating the first fluid mixture in the exhaust gas scrubbing and condensing heat exchanger with the exhaust gas mixture and the condensing heat of the expanded steam;

producing from the first fluid mixture a resulting second fluid mixture having a lower concentration of the fluid compound than the first fluid mixture;

producing from the fluid compound of the first fluid mixture a second fluid compound in a gaseous state;

delivering the resulting second fluid mixture from the exhaust gas scrubbing and condensing heat exchanger to the steam producer; and delivering the second fluid compound in the gaseous state to a condenser.

5. The method, as set forth in claim 4, including the steps of:

converting the second fluid compound from the gaseous state to a liquid state in the condenser;

delivering the second fluid compound in the liquid state from the condenser to an evaporator;

heating in the evaporator the second fluid compound in the liquid state by a heated engine lubrication oil and converting the second fluid compound from the liquid state to a gaseous state;

passing said second fluid compound in the gaseous state from said evaporator to said exhaust gas boiler and heating said second fluid compound in the gaseous state to an elevated energy level;

delivering said second fluid compound at said elevated energy level gaseous state to a fluid compound gas turbine and transferring a portion of the elevated energy level of said second fluid compound at said gaseous state into mechanical energy at said fluid compound gas turbine;

delivering said second fluid compound in said gaseous state from said fluid compound gas turbine to said steam producer;

combining said second fluid compound with by said second fluid mixture at said steam producer, absorbing the second fluid compound in said gaseous state by said second fluid mixture, generating a resulting heat by increasing the concentration of said second fluid compound in the second fluid mixture, and changing the state of the clean heated water to steam by said resulting heat.

6. The method, as set forth in claim 5, including the steps of;

cooling the exhaust gas mixture in the exhaust gas scrubbing and condensing heat exchanger;

drying the exhaust gas mixture in the exhaust gas scrubbing and condensing heat exchanger;

combining a portion of the exhaust gas mixture which has been cleaned, dried and cooled with ambient air to form a combustion intake gas mixture;

delivering the combustion intake gas mixture to a compressor;

boosting the pressure of the combustion intake gas mixture;

delivering said boosted combustion intake gas mixture from the compressor to a humidifier wherein the boosted combustion intake gas mixture is cooled and humidified; and delivering said cooled and humidified boosted combustion intake gas mixture to a combustion chamber inlet of the internal combustion engine and reducing nitrous oxides during a combustion process of the internal combustion engine through the use of both humidified air and the cooled, clean, and dry exhaust gas mixture.

7. The method, as set forth in claim 6, including the step of delivering a predetermined amount of clean water from the source of clean water to the humidifier.

8. The method, as set forth in claim 1, including the step of delivering steam from said steam turbine at a predetermined selected pressure to a combustion chamber inlet of the internal combustion engine and thereby reducing nitrous oxides produced during a combustion process of the internal combustion engine.

9. The method, as set forth in claim 2, including the step of delivering clean water from the source of clean water to a water intake nozzle connected to a combustion chamber inlet of the internal combustion engine.

10. The method, as set forth in claim 6, including the step of delivering a fuel mixture to the combustion chamber inlet.

11. The method, as set forth in claim 4, including the steps of:

converting the second fluid compound from the gaseous state to a liquid state in the condenser;

delivering said second fluid compound in said liquid state to a heat exchanger;

delivering from a compressor a pressure boosted and heated intake gas mixture;

increasing the temperature of the second fluid compound with the pressure boosted and heated intake gas mixture in the heat exchanger;

delivering the second fluid compound in the liquid state from the heat exchanger to an evaporator;

heating in the evaporator the second fluid compound in the liquid state by a heated engine lubrication oil and converting the second fluid compound from the liquid state to a gaseous state;

passing said second fluid compound in the gaseous state from said evaporator to said exhaust gas boiler and heating said second fluid compound in the gaseous state to an elevated energy level;

delivering said second fluid compound at said elevated energy level gaseous state to a fluid compound gas turbine and transferring a portion of the elevated energy level of said second fluid compound at said gaseous state into mechanical energy at said fluid compound gas turbine;

delivering said second fluid compound in said gaseous state from said fluid compound gas turbine to said steam producer;

combining said second fluid compound with said second fluid mixture at said steam producer, absorbing the compound fluid compound in said gaseous state by said second fluid mixture, generating a resulting heat, and changing the state of the clean heated water to steam by said resulting heat.

12. The method, as set forth in claim 11, including the steps of:

cooling the exhaust gas mixture in the exhaust gas scrubbing and condensing heat exchanger;

drying the exhaust gas mixture in the exhaust gas scrubbing and condensing heat exchanger;

combining a portion of the exhaust gas mixture which has been cleaned, dried and cooled with ambient air to form a combustion intake gas mixture;

delivering the combustion intake gas mixture to a compressor;

boosting the pressure of the combustion intake gas mixture;

delivering said boosted combustion intake gas mixture from the compressor to the heat exchanger;

removing additional heat from the boosted combustion intake gas mixture in said heat exchanger by transferring said heat to said second fluid compound; and delivering said cooled, cleaned and dried boosted combustion intake gas mixture from the heat exchanger to a combustion chamber inlet of the internal combustion engine.

13. The method, as set forth in claim 12, including the step of delivering steam from said steam turbine at a predetermined pressure to a combustion chamber inlet of the internal combustion engine and thereby reducing nitrous oxides produced during a combustion process of the internal combustion engine.

14. The method, as set forth in claim 12, including the step of delivering said clean water from the source of clean water to a water intake nozzle connected to a combustion chamber inlet of the internal combustion engine.

15. The method, as set forth in claim 12, including the step of delivering a fuel mixture to the combustion chamber inlet.

16. The method, as set forth in claim 6, including a common shaft and wherein said exhaust gas turbine, said compressor and at least one of said steam turbine and said fluid compound gas turbine are connected to the common shaft, and including the step of transferring mechanical energy between the exhaust gas turbine, the compressor, and said at least one steam turbine and compound gas turbine and the common shaft.

17. The method, as set forth in claim 16, including an electric motor/generator being connected to the common shaft and wherein said method including the step of delivering mechanical energy between the common shaft and the electric motor/generator.

18. The method, as set forth in claim 17, including the step of delivering electrical energy to the electric motor/generator and rotating the common shaft.

19. The method, as set forth in claim 17, including the step of rotating the common shaft and delivering electrical energy from the electrical motor/generator.

20. The method, as set forth in claim 17, including the step of disabling the electrical motor/generator from delivering and receiving said electrical energy.

21. The method, as set forth in claim 12, including a common shaft, and wherein said exhaust gas turbine, said compressor and at least one of said steam turbine and said fluid compound gas turbine are connected to the common shaft, and including the step of transferring mechanical energy between the exhaust gas turbine, the compressor, and said at least one steam turbine and the compound gas turbine and the common shaft.

22. The method, as set forth in claim 21, including an electric motor/generator being connected to the common shaft and wherein said method including the step of delivering mechanical energy between the common shaft and the electric motor/generator.

23. The method, as set forth in claim 22, including the step of delivering electrical energy to the electric motor/generator and rotating the common shaft.

24. The method, as set forth in claim 22, including the step of rotating the common graft and delivering electrical energy from the electrical motor/generator.

25. The method, as set forth in claim 22, including the step of disabling the electrical motor/generator from delivering and receiving said electrical energy from a source of electrical energy.

26. The method, as set forth in claim 4, including the steps of:

delivering a heated jacket water from the internal combustion engine to the source of clean water;

heating a water in a vacuum in the source of clean water by the heated jacket water and producing a steam and an extremely tainted water condensate;

condensing the steam in the source of clean water to a clean water, and delivering said clean water to the steam producer.

27. The method, as set forth in claim 26, including the steps of:

circulating the extremely tainted water condensate having undesirable impurities from the source of clean water through a filter;

filtering the extremely tainted water and removing the impurities therefrom;

passing the exhaust gas mixture from the exhaust gas scrubbing and condensing heat exchanger to the filter; and drying out the filtered impurities.

28. The method, as set forth in claim 27, including the steps of:

passing the filtered water from the filter to a water cooler and cooling the filtered water;

delivering the filtered water having been cooled from the water cooler to the condenser, cooling the second fluid compound passed from the exhaust gas scrubbing and condensing heat exchanger in the gaseous state by the filtered water having been cooled and converting the second fluid compound from the gaseous stated to a liquid state.

29. The method as set forth in claim 28, including the steps of:

delivering the filtered water from the condenser to the exhaust gas scrubbing and condensing heat exchanger and cleaning the exhaust gas mixture;

combining the filtered water with the water being aerated and passing a portion of a resulting makeup water to the source of clean water.

30. The method, as set forth in claim 29, including the step of producing clean heated water from a combination of the make up water and the water contained at the source of clean water.

31. A gas mixture preparation system for an internal combustion engine, comprising:
- an exhaust conduit being connected in fluid communication with a combustion chamber outlet of the internal combustion engine and passing an exhaust gas mixture from the combustion chamber outlet;
- an exhaust gas turbine being connected in fluid communication with the exhaust conduit and receiving said exhaust gas mixture from the combustion chamber outlet, said exhaust gas turbine rotating in response to receiving said exhaust gas mixture and passing said exhaust gas mixture therefrom;
- an exhaust gas boiler being connected in fluid communication with the exhaust gas turbine and receiving said exhaust gas mixture passed from the exhaust gas turbine;
- a steam producer being connected in fluid communication with said exhaust gas boiler and delivering a steam to the exhaust gas boiler, said exhaust gas boiler receiving said steam and increasing the energy level of the steam by increasing the temperature and pressure of the steam, said exhaust gas boiler passing the exhaust gas mixture;
- an exhaust gas scrubbing and condensing heat exchanger having a water aerator and containing a water therein is connected in fluid communication with the exhaust gas boiler, said exhaust gas scrubbing and condensing heat exchanger being adapted to receive the exhaust gas mixture being passed from the exhaust gas boiler;
- a steam turbine being connected in fluid communication with the exhaust gas boiler and the exhaust gas scrubbing and condensing heat exchanger, said steam turbine being connected by a common shaft to the exhaust gas turbine, said steam turbine and exhaust gas turbine being rotatable together, said steam turbine receiving said steam at said increased energy level and rotating in response thereto, said steam turbine expanding the steam and delivering the expanded steam to the exhaust gas scrubbing and condensing heat exchanger;
- said exhaust gas scrubbing and condensing heat exchanger combining the expanded steam with the exhaust gas mixture, condensing the expanded steam to water, aerating the water to produce aerated water, cleaning the exhaust gas mixture by transferring an undesirable substances in the exhaust gas mixture to the aerated water and drying the cleaned exhaust gas mixture by condensing.

32. The gas mixture preparation system, as set forth in claim 31, including a source of clean water connected by a clean water conduit to the steam producer, said source of clean water delivering clean water to the steam producer, said steam producer producing said steam from the clean water.

33. The gas mixture preparation system, as set forth in claim 32, including:
- an evaporator being connected in fluid communication with the exhaust gas boiler and delivering a second fluid compound in a gaseous state to the exhaust gas boiler, said second fluid compound having a lower boiling point than water;
- a first fluid passing transfer conduit connected to a supply of internal combustion engine fluid and to the evaporator, said first fluid passing transfer conduit being adapted to deliver an internal combustion engine fluid in a heated state to the evaporator and providing an amount of heat energy sufficient to heat the second fluid compound above the boiling point and convert the second fluid compound into a gaseous state;
- a second fluid passing transfer conduit connected to the evaporator and to the supply of internal combustion engine fluid, said second fluid passing transfer conduit delivering the internal combustion engine fluid in a cooled state to the supply of internal combustion fluid.

34. The gas mixture preparation system, as set forth in claim 33, including:
- a fluid compound gas turbine being connected to said common shaft and rotatable therewith, said fluid compound gas turbine being connected in fluid communication with the exhaust gas boiler and connected in fluid communication with the steam producer;
- said exhaust gas boiler heating the second fluid compound in the gaseous state to an elevated energy level and delivering said second fluid compound to the fluid compound gas turbine;
- said fluid compound gas turbine transferring a portion of the elevated energy level of the second fluid compound at said gaseous state into mechanical energy on the common shaft, and delivering the second fluid compound at a reduced energy level in the gaseous state to the steam producer.

35. The gas mixture preparation system, as set forth in claim 34, including:
- a first fluid mixture passing conduit connected between the steam producer and the exhaust gas scrubbing and condensing heat exchanger, said first fluid mixture passing conduit passing a first fluid mixture having a predetermined concentration of water and a fluid compound having a lower boiling point than water to the exhaust gas scrubbing and condensing heat exchanger, said first fluid mixture being heated by the exhaust gas mixture and the expanded steam condensed therein and producing a second fluid mixture having a lower concentration of the fluid compound by driving out the second fluid compound in the gaseous state; and
- a second fluid mixture passing conduit connected between the steam producer and the exhaust gas scrubbing and condensing heat exchanger, said second fluid mixture passing conduit delivering the second fluid mixture to the steam producer, said steam producer combining the second fluid mixture with the second fluid compound in the gaseous state, absorbing the compound fluid compound in said gaseous state by the second fluid mixture, generating a resulting heat and changing the state of the clean heated water into said steam being delivered to said exhaust gas boiler.

36. The gas mixture preparation system, as set forth in claim 35, including a condenser connected in fluid communication with the exhaust gas scrubbing and condensing heat exchanger, said condenser receiving said second fluid compound driven out by the exhaust gas scrubbing and condensing heat exchanger in the gaseous state and converting said second compound from the gaseous state to the liquid state.

37. The gas mixture preparation system, as set forth in claim 36, including:
- an exhaust conduit connected to said exhaust gas scrubbing and condensing heat exchanger and passing a cleaned, dried and cooled exhaust gas mixture therefrom;
- a compressor connected to the common shaft and rotatable in response to rotation of the common shaft,
- a compressor inlet conduit in fluid communication with said compresso;

a compressor outlet in fluid communication with a combustion chamber inlet of the internal combustion engine;

an exhaust gas recirculation conduit connected to said exhaust conduit and said compressor inlet conduit;

an ambient air conduit connected to said compressor inlet conduit and being open to receive ambient air;

said compressor receiving from the compressor inlet conduit a charge gas mixture of at a least a portion of the cooled, dried and clean exhaust gas mixture from the exhaust gas recirculation conduit and the ambient air from the ambient air conduit, boosting the pressure of the charge gas mixture and delivering a charge gas mixture through the compressor outlet to the combustion chamber inlet of the internal combustion engine.

38. The gas mixture preparation system, as set forth in claim 37, including:

a heat exchanger having an inlet conduit and an outlet conduit and being connected by the inlet conduit of the heat exchanger t o the compressor outlet and by the outlet conduit to the combustion chamber inlet, said heat exchanger removing heat from the charge air mixture;

said heat exchanger being connected in fluid communication with the condenser, receiving said second fluid compound flow in the liquid state, and heating said second fluid compound by transferring heat from the charge air mixture and delivering said second fluid compound flow in said liquid state to said evaporator.

39. The gas mixture preparation system, as set forth in claim 37, wherein said source of clean water including:

a first water jacket fluid passing conduit being connected between a water jacket of the internal combustion engine and the source of clean water, said first water jacket fluid passing conduit passing a water jacket fluid having been heated to the source of clean water;

said source of clean water transferring the heat energy from the water jacket fluid and heating, condensing, and separating undesirable impurities from a water contained in the source of clean water, and delivering the cleaned heated water therefrom; and a second water jacket fluid passing conduit being connected between the water jacket of the internal combustion engine and the source of clean water, said second water jacket fluid passing conduit passing the water jacket fluid having been cooled to the water jacket of the internal combustion engine.

40. The gas mixture preparation system, as set forth in claim 39, including:

a first tainted water conduit connected to and between the source of clean water and the exhaust gas scrubbing and condensing heat exchanger; and a second tainted water conduit connected to and between the source of clean water and the exhaust gas scrubbing and condensing heat exchanger, said first and second tainted. Water conduits circulating a tainted water containing emission particles, water from the exhaust gas mixture, and condensed expanded steam which has been dried and cleaned, and a filtered water supplied to the exhaust gas scrubbing and condensing heat exchanger, between the source of clean water and the exhaust gas scrubbing and condensing heat exchanger, said source of clean water condensing and separating said clean water from the tainted water.

41. The gas mixture preparation system, as set forth in claim 40, including:

a filter connected to said exhaust conduit and receiving a heat from said cleaned, dried and cooled exhaust gas delivered from said exhaust gas scrubbing and condensing heat exchanger;

an extremely tainted water passing conduit connected to the source of clean water and to the filter and delivering an extremely tainted water from the source of clean water to the filter, said filter filtering the extremely tainted water, removing undesirable substances, and passing a filtered water therefrom;

a water cooler;

a filter water passing conduit connected to and between the filter and said water cooler and passing said filtered water to the water cooler, said water cooler cooling the filtered water and passing a cooled filter water to the condenser, said condenser changing the state of the second fluid compound from the gaseous state to the liquid state, heating the cooled filtered water, and passing a resulting heated filtered water through a heated filter water conduit to the exhaust gas scrubbing and condensing heat exchanger.

42. The gas mixture preparation system, as set forth in claim 39 including:

a humidifier connected to and between the compressor outlet and the combustion chamber inlet;

a first clean water passing conduit connected between the source of clean water and the humidifier, said first clean water passing conduit delivering said clean water to the humidifier, humidifying and cooling the charge gas mixture being delivered to the combustion chamber inlet and thereby reducing nitrous oxides produced during a combustion process of the internal combustion engine; and a second clean water passing conduit passing an unused portion of the clean water to the source of clean water.

43. The gas mixture preparation system, as set forth in claim 37, including a steam conduit connected to an outlet of the steam turbine and to a combustion chamber inlet of the internal combustion engine, said steam conduit delivering steam from the steam turbine at a predetermined pressure to the combustion chamber inlet of the internal combustion engine and thereby reducing nitrous oxides produced during a combustion process of the internal combustion engine.

44. The gas mixture preparation system, as set forth in claim 37, including a source of fuel mixture flow connected to the combustion chamber inlet and being adapted to deliver a fuel mixture flow to the combustion chamber inlet, and thereby reducing nitrous oxides produced during a combustion process of the internal combustion engine.

45. The gas mixture preparation system, as set forth in claim 44, including:

a water intake nozzle connected to said combustion chamber inlet and being adapted to inject water into the combustion chamber inlet;

a water injector conduit connected between said source of clean water and said water intake nozzle and being adapted to deliver clean water to the water intake nozzle, and thereby reducing nitrous oxides produced during a combustion process of the internal combustion engine.

46. The gas mixture preparation system, as set forth in claim 37, wherein the exhaust gas turbine, and at least one of said steam turbine and compound gas turbine delivering mechanical energy to the common shaft.

47. The gas mixture preparation system, as set forth in claim 37, including an electric motor/generator being connected to the common shaft and being adapted to receive and to deliver mechanical energy relative to the common shaft.

48. The gas mixture preparation system, as set forth in claim 47, including:

an electrical energy source;

an electric switch connected to the electric motor/generator and to the source of electrical energy, said electrical switch being actuatable between a closed position at which electrical energy flows between the electrical energy source and said electric motor/generator an open position at which electrical energy is blocked from flowing between said electrical energy source and said electric motor/generator.

* * * * *

UNITED STATES PATENT AND TRADEMARK OFFICE
CERTIFICATE OF CORRECTION

PATENT NO.     : 6,301,890 B1                                                Page 1 of 1
DATED          : October 16, 2001
INVENTOR(S)    : Herbert Zeretzke It is certified that error appears in the above-identified patent and that said Letters Patent is hereby corrected as shown below:

Column 11,
Line 60, remove the word "by".

Column 13,
Line 6, remove the first instance of "compound" and replace with -- second --.

Column 14,
Line 16, remove the word "graft" and replace with -- shaft --.

Column 16,
Line 45, remove the first instance of "compound" and replace with -- second --.

Column 17,
Line 20, remove the space between "t" and "o".
Line 57, remove the period (.) after "tainted" and replace the capital "W" with a lowercase -- w -- in the word "Water".

Signed and Sealed this

Twenty-second Day of October, 2002

Attest:

Attesting Officer

JAMES E. ROGAN
*Director of the United States Patent and Trademark Office*